I. KARPEN.
TIRE PROTECTOR.
APPLICATION FILED FEB. 5, 1914.
1,202,726.
Patented Oct. 24, 1916.
2 SHEETS—SHEET 1.
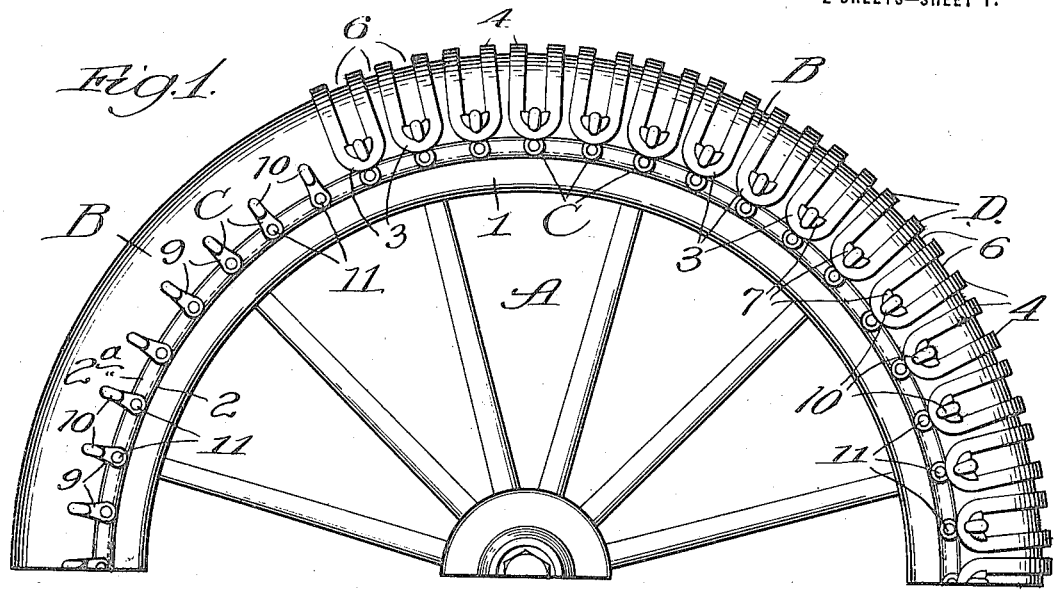
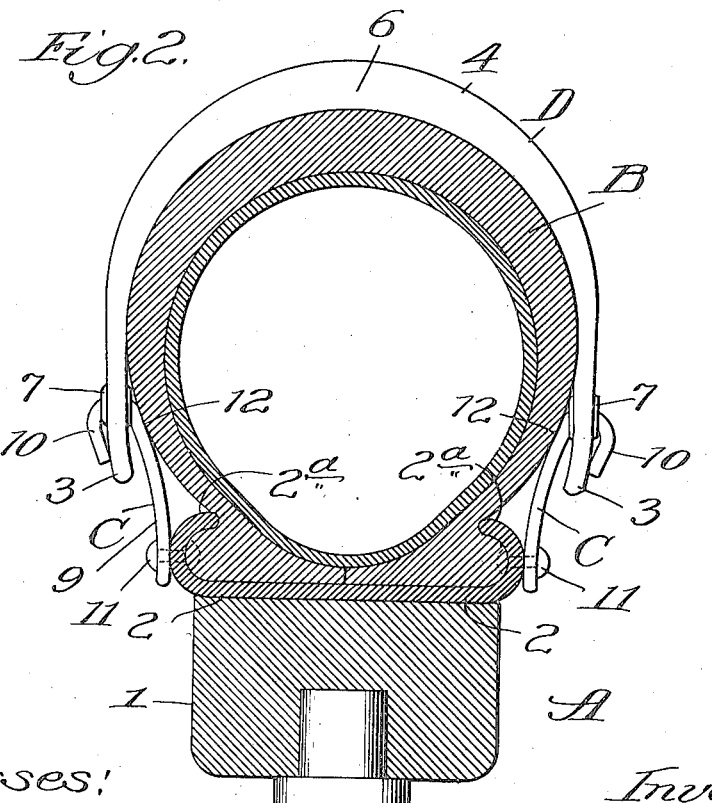
Witnesses:
Inventor:
Isaac Karpen, I. KARPEN.
TIRE PROTECTOR.
APPLICATION FILED FEB. 5, 1914.
1,202,726.
Patented Oct. 24, 1916.
2 SHEETS—SHEET 2.
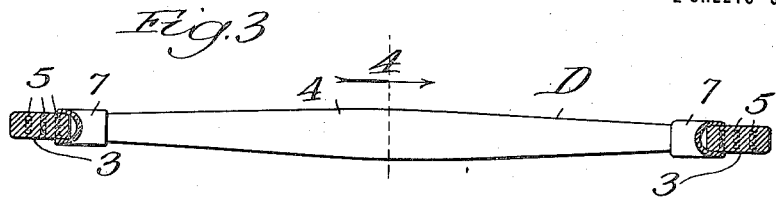
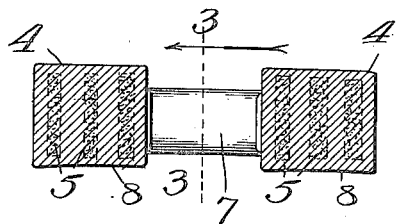
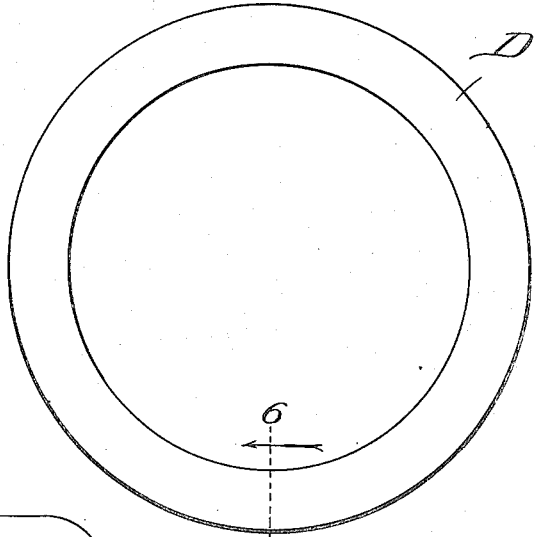
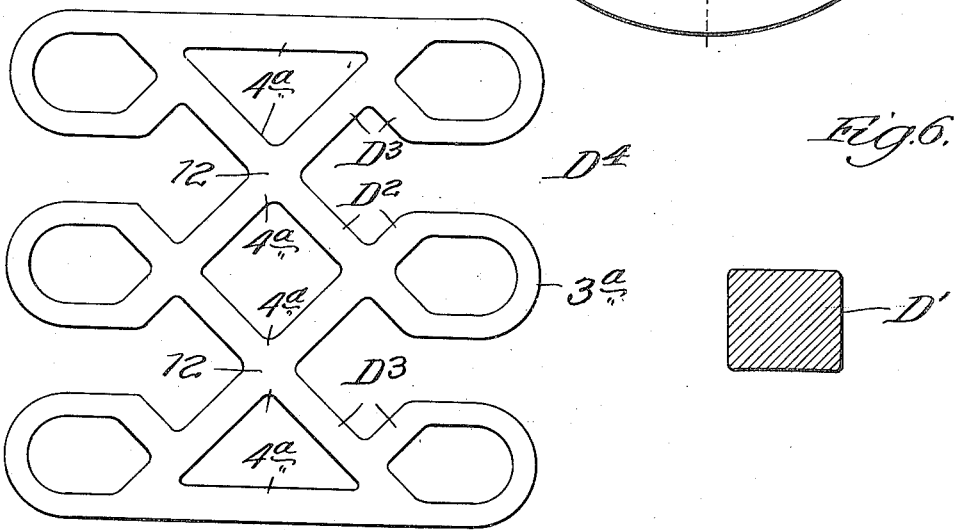
Witnesses:
Inventor:
Isaac Karpen,

UNITED STATES PATENT OFFICE.

ISAAC KARPEN, OF CHICAGO, ILLINOIS.

TIRE-PROTECTOR.

1,202,726.

Specification of Letters Patent.

Patented Oct. 24, 1916.

Application filed February 5, 1914. Serial No. 816,788.

*To all whom it may concern:*

Be it known that I, ISAAC KARPEN, a citizen of the United States, residing at Chicago, in the county of Cook and State of Illinois, have invented a new and useful Improvement in Tire-Protectors, of which the following is a specification.

This invention relates particularly to devices adapted for the protection of pneumatic tires, and constitutes a modification of the invention set forth and generically claimed in my application No. 816,787, filed of even date herewith.

The invention contemplates the use of elastic tread-blocks stretched across the tread-portion of the tire and removably secured in place, said tread-blocks to be used continuously until worn out, when they can be replaced by others. The tread-blocks thus serve both as a tire-protecting means and anti-skid means, always in place on the tire and nevertheless free from all rattling and injurious effect upon the tire. In fact, the improved device serves as a constant protection to the pneumatic tire and preserves the integrity of the tire for a prolonged period, while the comparatively inexpensive tread-blocks can be renewed as frequently as required, thereby effecting great economy, as well as insuring the motorist against tire troubles and against dangerous skidding.

According to the present invention, the tire-clenching means, or tire-securing rim-device of the wheel, is equipped on each side of the tire with a plurality of hooks or attaching devices, and the improved tread-blocks employed are detachably secured thereto.

The invention is illustrated in its preferred embodiment in the accompanying drawings, in which—

Figure 1 represents a broken elevational view of a wheel provided with a pneumatic tire and equipped with my improved tire-protecting means; Fig. 2, an enlarged sectional view of the same; Fig. 3, a longitudinal sectional view of one of the tread-blocks employed, before it is curved over the tire and secured in place; Fig. 4, a sectional view of the tread-block taken as indicated at line 4 of Fig. 3; Fig. 5, a plan view of a modified form of tread-block; Fig. 6, a section taken as indicated at line 6 of Fig. 5; and Fig. 7, a plan view of another modified form of tread-block.

In the construction shown in Figs. 1 to 4 inclusive, A represents a wheel having a felly 1 equipped with a tire-clenching rim device 2, which may be of any suitable construction; B, a pneumatic tire applied to the wheel; C, a series of hooks or attaching devices carried by the clencher-flanges of the rim 2; and D, elastic tread-blocks stretched across the tire and engaging the hooks C which flank the lower portion of the tire. Each tread-block preferably comprises a pair of hook-engaging loops 3 and a plurality of elastic tread-engaging members 4 stretched across the tread-portion of the tire. It is preferred to make each tread-block of rubber, or of a suitable rubber compound, which may, if desired, have embedded therein fiber or canvas strips 5. Where canvas strips are employed, it is preferred to have them disposed in vertical planes, as shown in Fig. 4, so that as the tread-block wears, the edges of the canvas strips are exposed at the wearing surface, thus providing a friction element in connection with the rubber. The canvas strips may also serve the additional purpose of preventing undue stretching of the tread-blocks, without interfering with a certain desirable elasticity in the tread-blocks, which will cause them at all times to closely hug the tire. The tread-blocks are desirably made of substantial size and durable materials, for the two-fold purpose of holding the tread-portion of the tire out of contact with the pavement and serving with certainty the function of an anti-skid device, the further purpose being to obviate the necessity of frequent renewals of the tread-blocks. It is highly desirable to use a material having the elastic properties, impermeability and wear-resisting qualities of rubber, and any material having these qualities is to be regarded as an equivalent of rubber. The tread-engaging portions 4 of the tread-blocks are preferably made of larger cross-section than the loop-portions 3, thus placing the bulk of the rubber at the location where it is most needed for resisting purposes, as well as for the purpose of elevating the tire from the pavement and forming suitably deep interstices or spaces 6, which aid in the anti-skidding function of the device. The tread-blocks may be molded, or may be formed in any suitable manner. It is preferred to provide the loops 3 at their inner concaved portions with crescent-shaped metal clips 7, thus armoring the loops at the points where they engage the hooks C. The tread-portions of the tread-blocks are preferably thickest and of largest cross-section directly over the largest circumference of the tire, as will be understood from Figs. 2, 3, and 4.

The tread-blocks may be of elongated form shown in Figs. 1 to 4 inclusive, and may be bent to conform to the cross-section of the tire in stretching the tread-blocks upon the hooks C. If desired, the lower or inner surfaces of the tread-portions of the tread-blocks may be made slightly concaved to conform to the tire, as indicated at 8 in Fig. 4.

Each hook C has a shank-portion 9 and an outwardly and downwardly-turned hook-portion 10. The shanks are shown secured to the tire-securing flanges 2ª of the rim 2 by rivets or pivots 11, and the upper portion of the shank is shown curved slightly to afford a smooth bearing at the point 12, thus affording supports for the lower portion of the inflated tire some distance above or outside the clencher-flanges 2ª. The attaching devices C are carried by the tire-securing rim of the wheel, which, as is well known, may be constructed in various ways. It is not essential that the hook devices C should be formed separately from the tire-attaching device 2.

In the construction shown in Figs. 5 and 6, the tread-block D' is originally made in circular form, and may be of uniform cross-section. In applying a tread-block of this form, it is stretched to the elongated form and caused to engage the hooks C; and, if desired, after the tread-blocks of this form have been used for a time, they may be shifted on the hooks so that the worn portions will engage the hooks, while the portions which formerly engaged the hooks will be disposed over the tread-portion of the tire. In this manner, the life of the tread-blocks may be greatly lengthened.

In Fig. 7, there are illustrated a series of tread-blocks D², D³, D³, each comprising loops 3ª and tread-engaging portions 4ª uniting the loops; and the tread-blocks are shown united at the points 12, thus giving the effect of a united series of tread-blocks having the loops 3ª spaced to correspond with the spacing of the hooks C. Otherwise considered, the device shown in Fig. 7 may be regarded as a single tread-block D⁴, composed of a series of smaller tread-blocks constructed and united in the manner described. It is preferred to make the tread-engaging portions of the tread-blocks of greater cross-section than the loop-portions, as shown in the illustration in Fig. 3.

It is desirable, though not essential, especially when the tread-blocks are separately formed, to so proportion and form the tread-portions and stretch the tread-blocks across the tire so tightly that the tread-portions will retain their proper seating on the tread-portion of the tire, in the manner illustrated. Nevertheless, a certain amount of yielding is desirable to prevent injury when the tread-blocks strike violently against projections in the road.

From the foregoing description, it will be understood that the elastic tread-blocks employed snugly embrace the tire and may be used continuously until worn out, when they can be readily replaced. The wheel, thus protected, will run smoothly and quietly over a pavement, the pneumatic tire will be protected from wearing and very largely protected from danger of cuts or punctures, and the integrity of the tire will be preserved, thus avoiding danger of blow-out and preserving the expensive tire for a prolonged period. The tread-blocks can be produced cheaply and the tire can be thus preserved in perfect condition, even though subjected to prolonged usage of the hardest character. Moreover, the anti-skidding function of the tread-blocks is always present, thus tending to the further preservation of the tire, as well as obviating danger to the machine and its occupants.

The foregoing detailed description has been given for clearness of understanding only, and no unnecessary limitation should be understood therefrom, but the appended claims should be construed as broadly as permissible in view of the prior art.

What I regard as new, and desire to secure by Letters Patent, is—

1. The combination with a wheel equipped with a rim provided with tire-securing flanges, and a pneumatic tire secured thereby, of a series of hooks carried by said rim and disposed at each side of the lower or inner portion of the tire, and a plurality of elastic tread-blocks stretched across the tread-portion of the tire, each tread-block comprising hook-engaging loops and a plurality of rubber tread-engaging members extending across the tire.

2. The combination with a wheel equipped with a tire-securing rim, and a pneumatic tire secured thereby, of two series of hooks projecting radially outward from and pivotally attached to said rim, one series being disposed at each side of the base-portion of the tire, and a plurality of elastic tread-blocks stretched across the tread-portion of the tire, the tread-blocks comprising hook-engaging loops and tread-portions extending across the tire.

3. The combination with a wheel equipped with a tire-securing rim, and a pneumatic tire secured thereby, of a series of hooks projecting radially outward from and carried by said rim, one series being disposed at each side of the base-portion of the tire, and a plurality of tread-blocks stretched across the tread-portion of the tire and engaging said hooks, each tread-block comprising a series of loops at each side of the tire and tread-members connecting the loops, said tread-members being united together at points over the tread-portion of the tire.

ISAAC KARPEN.

In presence of—
  O. C. Avisus,
  A. C. Fischer.